United States Patent [19]

Eto et al.

[11] Patent Number: 4,907,461
[45] Date of Patent: Mar. 13, 1990

[54] TORQUE SENSOR

[75] Inventors: Kunihiko Eto; Shirou Takeuchi, both of Toyota; Yasuo Shiba, Okazaki, all of Japan

[73] Assignee: Toyoda Koki Kabushiki Kaisha, Kariya, Japan

[21] Appl. No.: 314,964

[22] Filed: Feb. 24, 1989

[30] Foreign Application Priority Data

Feb. 26, 1988 [JP] Japan ................... 63-42213

[51] Int. Cl.⁴ ............................................. G01L 3/10
[52] U.S. Cl. ................................................ 73/862.33
[58] Field of Search ......................... 73/862.32, 862.33

[56] References Cited

U.S. PATENT DOCUMENTS 2,964,017  12/1960  Hruska .
4,783,626  11/1988  Shimizu ................. 73/862.33 X
4,809,557   3/1989  Maurer et al. ............ 73/862.32

FOREIGN PATENT DOCUMENTS 58-70136   4/1983  Japan .
59-32835   2/1984  Japan .
    3632   1/1987  Japan ................. 73/862.33
 288360  12/1970  U.S.S.R. .............. 73/862.33
 466414   7/1975  U.S.S.R. .

*Primary Examiner*—Charles A. Ruehl
*Attorney, Agent, or Firm*—Oblon, Spivak, McClelland, Maier & Neustadt

[57] ABSTRACT

A torque sensor for use with an automotive steering system. The sensor includes a driving shaft, a driven shaft, a sleeve cylinder fitted over one of the shafts so as to be rotatable and axially movable, a differential transformer, first and second connector members, a spring, and a torsion bar. The amount of axial movement of the sleeve cylinder is detected by the transformer. The connector members are inclined in opposite directions within a plane parallel to the axis of the shafts. One end of the first connector member is connected to the cylinder, while the other is connected to the driving shaft. One end of the second connector member is connected also to the cylinder, the other being connected to the driven shaft. Torque is transmitted from the driving shaft to the driven shaft via the torsion bar. The spring is mounted between one of the shafts and the sleeve cylinder.

8 Claims, 4 Drawing Sheets

TORQUE SENSOR

BACKGROUND OF THE INVENTION

1. Field of the Invention:

The present invention relates to a torque sensor for detecting the torque transmitted from a driving shaft to a driven shaft. The torque sensor can be used with the steering system of an automobile, for example.

2. Discussion of the Prior Art:

A mechanism for actuating values which control a conventional power steering system is disclosed, for example, in U.S. Pat. No. 2,964,017 issued to Howard E. Hruska. This known mechanism is not a torque sensor but is unique in structure. Specifically, as shown in FIG. 1, a slide cylinder 53 on a driving shaft 51 is coupled by springs 55 to a fixed sleeve 54 on a driven shaft 52. Rotation of the driving shaft 51 causes the slide cylinder 53 to move axially. The axial movement of the cylinder 53 is transmitted to a spool (not shown).

In this known mechanism, when the steering wheel is in its neutral position, the springs 55 are inclined at 45 degrees to the axis of the shafts. As the driving shaft 51 is rotated, the angle formed between each spring and the axis is increased or reduced. Therefore, the distance that the slide cylinder 53 moves axially as the driving shaft 51 rotates through a given angle varies, depending on the former angle. As a result, the amount of the axial movement of the slide cylinder changes, depending on whether the steering wheel is rotated clockwise or counterclockwise even if the driving shaft is rotated through a given angle. Thus, where this mechanism is applied to a torque sensor, the detected torque value varies according to the direction of rotation of the driving shaft if the same torque acts on the driving shaft.

SUMMARY OF THE INVENTION

Accordingly, it is a main object of the invention to provide a torque sensor capable of moving a sleeve cylinder a given distance axially relative to a driven shaft irrespective of the direction of rotation of a driving shaft when the driving shaft is rotated through a given angle relative to a driven shaft.

It is another object of the invention to provide a torque sensor capable of accurately detecting torque transmitted from a driving shaft to a driven shaft without being affected by the flexural rigidity of a member which converts the relative rotation between the shafts into axial movement of a sleeve cylinder, the member being preferably shaped into a linear form.

It is a further object of the invention to provide a torque sensor which has the features described in the preceding paragraphs and in which the ends of at least two similar connector legs of motion converter members are fitted in holes formed in the shafts and the sleeve cylinder to prevent detected torque from producing hysteresis when the direction of rotation is changed.

In brief a torque sensor according to the invention includes a driving shaft and a driven shaft which are rotatably held and disposed on a common axis in an opposite relation to each other. Axial displacement of a sleeve cylinder is detected by a detector. The cylinder is fitted over one of the shafts at its end opposite to the other such that the cylinder can rotate and slide axially. A first connector member and a second connector member are inclined in opposite directions within a plane parallel to the axis of the shafts. One end of the first connector member is connected to the sleeve cylinder, while the other is connected to the axial end of the driving shaft. One end of the second connector member is connected also to the sleeve cylinder, whereas the other is connected to the axial end of the driven shaft. Further, a means is provided to urge one of the shafts to angularly move relative to the sleeve cylinder.

In the above-described structure, when the driving shaft is rotated to transmit torque to the driven shaft to which a load is applied, a torsion bar whose opposite ends are coupled to the shafts, respectively, is twisted. The driven shaft is turned in response to rotation of the driving shaft such that a phase difference is produced between them. Since the first and second connector members are maintained under tension by the urging means, when a phase difference is produced between the shafts, the tension applied to one connector member is about to be reduced, while the other is maintained under the same tension. The reverse situation can occur, depending on the direction of rotation. However, since the urging means biases the sleeve cylinder in the same direction as the direction of the rotational displacement of the driving shaft, both connector members are pulled. As a result, the sleeve cylinder is displaced axially. The direction and the amount of the displacement of the sleeve cylinder which represent the direction and the magnitude, respectively, of the transmitted torque are precisely detected by a detector.

The novel torque sensor has the advantage that detection of the torque is unaffected by the flexural rigidity of the connector members, because the spring forces of the connector members are not employed in converting angular displacement into axial displacement; the connector members are used only to maintain the distance between two points. Consequently, the conversion is effected precisely. Also, there is no possibility of fatigue failure. Further, conversion operation produces no hysteresis even if any gap is created during assembly operation.

DESCRIPTION OF THE PREFERRED EMBODIMENTS

Figure 1:
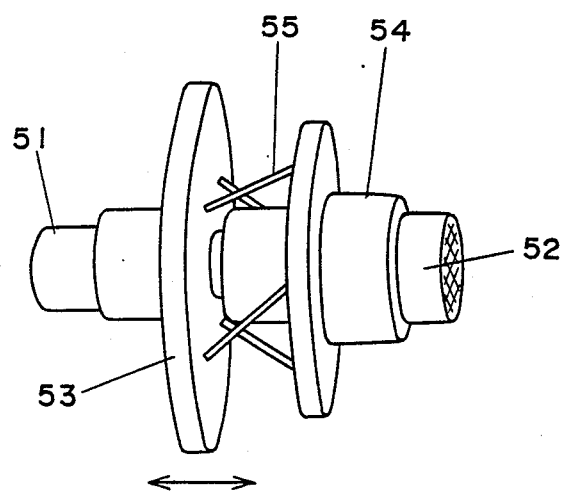
FIG. 1 is a perspective view of a conventional mechanism applicable to a torque sensor.
Figure 2:
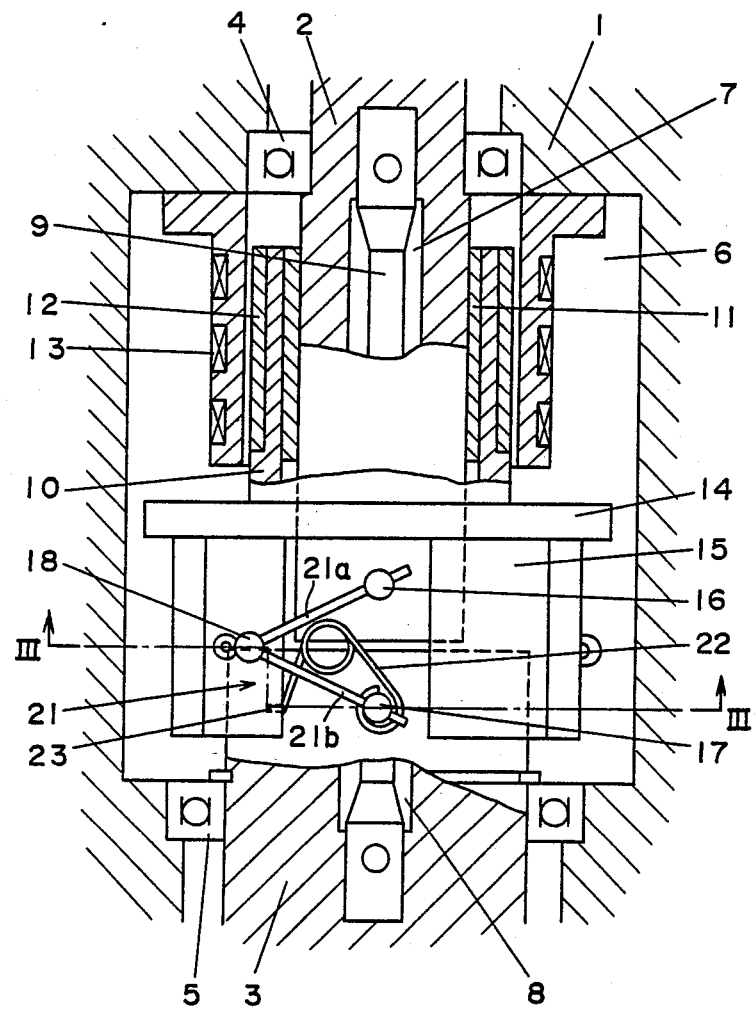
FIG. 2 is a front elevational view partially in cross section of a torque sensor according to the invention.
Figure 3:
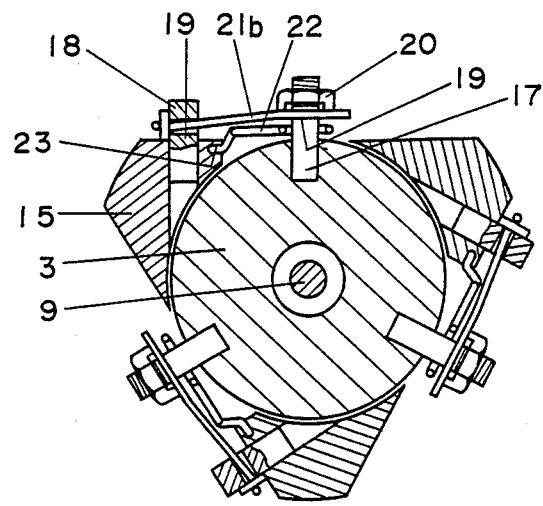
FIG. 3 is a cross-sectional view taken on line III—III of FIG.

Referring to FIGS. 2 and 3, there is shown a torque sensor embodying the concept of the invention. The sensor has a housing 1 in which a driving shaft 2 and a driven shaft 3 are coaxially mounted in such a way that their axial ends are opposite to each other. The shafts 2 and 3 are rotatably held by bearings 4 and 5, respectively. The housing 1 is provided with a cylindrical void 6 near the opposite axial ends of the shafts. The shafts 2 and 3 are centrally formed with holes 7 and 8, respective, which extend from their opposite end surfaces. The driven shaft 3 is coupled coaxially to the driving shaft 2 via a torsion bar 9 whose opposite ends are rigidly fixed to the bottom surfaces of the holes 7 and 8, respectively. Torque is transmitted from the driving shaft 2 to the driven shaft 3 via the bar 9.

A slide sleeve 11 is fitted in a cylinder 10, which is held to the driving shaft 2 via the sleeve 11 inside the void 6 in the housing 1. Thus, the cylinder 10 is capable of rotating and axially sliding relative to the driving shaft 2. An iron core 12 is rigidly fixed to the outer surface of the cylinder 10. A differential transformer 13 firmly attached to the housing 1 surrounds the outer periphery of the cylinder 10 with a slight gap formed therebetween to electrically detect the axial displacement of the core 12, or of the sleeve cylinder 10.

The sleeve cylinder 10 has a flange 14 at its end on the side of the driven shaft. A plurality of protrusions 15 which are circumferentially regularly spaced from each other are formed on the flange 14 and extend axially. In the illustrated example, the protrusions 15 are three in number and spaced 120 from each other. The number of the protrusions 15 can be selected appropriately according to the design factors.

Fixed pins 16 which are equal in number to the protrusions 15 extend radially from the outer surface of the driving shaft 2 near its axial end surface opposite to the driven shaft 3. The pins 16 are circumferentially equally spaced from each other. Similarly, fixed pins 17 that are equal in number to the protrusions 15 extend radially from the outer surface of the driven shaft 3 near its axial end surface opposite to the driving shaft 2. The pins 17 are circumferentially regularly spaced from each other. A fixed pin 18 extends from one side surface of each protrusions 15 such that all pins 18 are arranged on a circle. Each of the fixed pins 16, 17, 18 is provided with a hole 19 extending through it diametrically. Each of the pins 16 and 17 has a screw thread to which a nut 20 is screwed.

After the driving shaft 2, the driven shaft 3, the torsion bar 9, and the sleeve cylinder 10 have been assembled, the protrusions 15 on the sleeve cylinder 10 partially cover the axial end surface of the driven shaft 3. The pins 16 and 17 between two neighboring protrusions 15 are aligned axially. The pin 18 closest to these pins 16 and 17 extends substantially parallel to the pins 16, 17, and is disposed axially midway between the pins 16 and 17.

The fixed pins 16, 17, 18 form plural sets of pins, three sets being shown in the illustrated example. A V-shaped linear member 21 is fixed to the pins 16–18 of each set. A spring 22 in the form of scissors is mounted to the pin 17 or 16 and to the protrusion 15. More specifically, the apical portion of the V-shpaed linear member 21 is inserted in the hole 19 in the pin 18 via a washer. Both legs 21a and 21b of the member 21 are inserted in the holes 19 formed in the pins 16 and 17, respectively. The legs 21a, 21b are mounted to the pins by tightening the nuts 20 screwed to the front ends of the pins. The front end portion of one leg of the spring 22 is wound on the pin 17 or 16, while the front end portion of the other leg is inserted in a small hole 23 formed in the protrusion 15. Therefore, the spring 22 always biases the pin 18 away from the pins 16 and 17 to maintain both legs 21a and 21b of the linear member 21 stretched.

Figure 4:
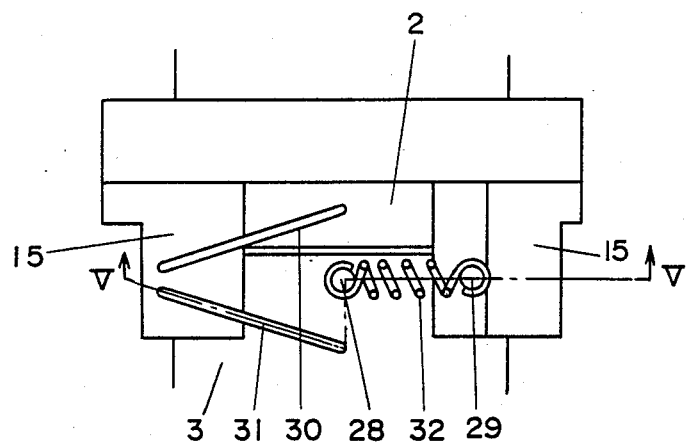
FIG. 4 is a fragmentary front elevational view of another torque sensor according to the invention.
Figure 5:
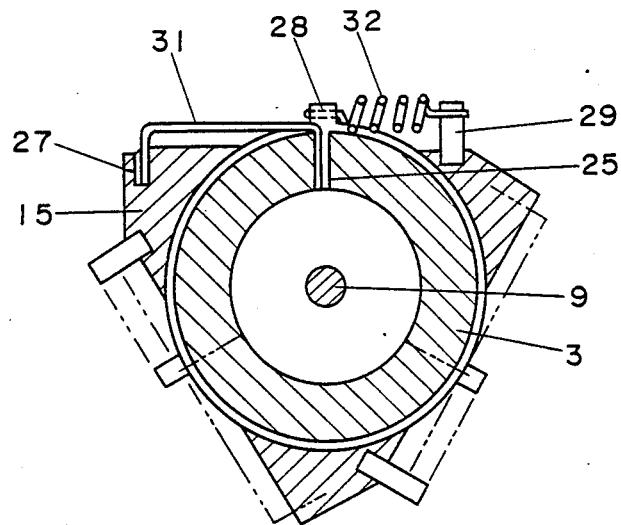
FIG. 5 is a cross-sectional view taken on line V—V of FIG. 4.
Figure 6:
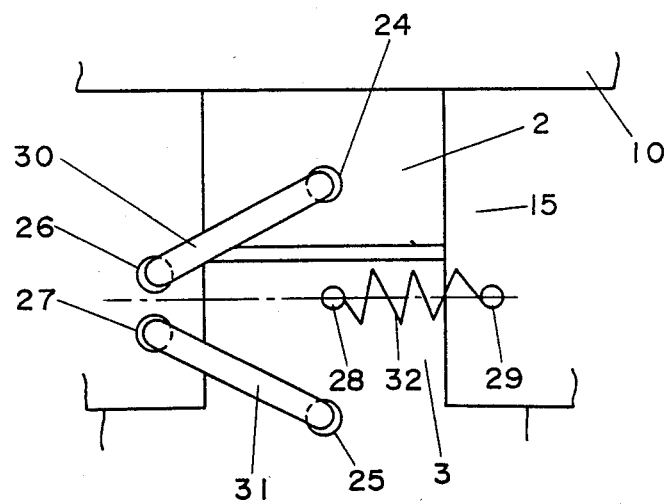
FIG. 6 is an enlarged view of a part of FIG. 4.

Referring next to FIGS. 4, 5, and 6, there is shown another torque sensor which is similar to the torque sensor already described except for connector members, springs, and the way in which they are mounted or fixed. Holes 24 which are equal in number to the protrusions 15 are formed in the driving shaft 2 near its axial end surface opposite to the driven shaft 3. The holes 24 are circumferentially equally spaced from each other. Likewise, holes 25 which are equal in number to the protrusions 15 are formed in the driven shaft 3 near its axial end surface opposite to the driving shaft 2. The holes 25 are circumferentially regularly spaced from each other. Two neighboring holes 26 and 27 are formed in one side surface of each protrusion 15 and aligned axially.

Pins 28 for mounting springs protrude from the outer surface either of the driven shaft 3 or of the driving shaft 2 near its axial end. The radially mounted pins 28 are equal in number to the protrusions 15 and circumferentially regularly spaced from each other. Pins 29 for mounting a tension spring 32 protrude from other side surfaces of the protrusions 15 and are disposed on a circle. An annular groove is formed in the head of each of the pins 28 and 29.

After the drivng shaft 2, the driven shaft 3, the torsion bar 9, and the sleeve cylinder 10 have been assembled, the protrusions 15 partially cover the axial end surface of the driven shaft 3. The holes 24 and 25 between two adjacent protrusions 15 are aligned axially. Two aligned holes 26 and 27 are axially intermediate between these holes 24 and 25. The pins 28 and 29 are arranged on a circle.

The holes 24, 25, 26, 27 form plural sets of holes. In the illustrated example, three sets of holes are formed. A straight spring 30 has bent portions near its both ends. The bent portions are inserted in the holes 24 and 26 of one set of holes. Also, another straight spring 31 has bent portions near its both ends, and the bent portions are inserted in the holes 25 and 27 of the same set. The tension spring 32 has hook portions at its both ends. The hook portions are inserted in the annular grooves formed in the pins 28 and 29. Thus, the spring 32 urges the holes 24, 25 away from the holes 26, 27 at all times. As a result, the bent portions of the springs 30 and 31 are fitted in the holes 24–27, respectively, i.e., no play is left.

In the above examples, the V-shaped linear member 21 and the straight springs 30, 31 are made of piano wire, nylon wire, or other wire. The aforementioned relation between the driving shaft 2 and the driven shaft 3 in each torque sensor can be reversed.

Operation of the above-described torque sensors is now described. In each torque sensor, when the driving shaft 2 is driven to transmit torque to the dirven shaft 3 to which a load is applied, the torque is transferred by means of the torsion bar 9 irrespective of the direction of rotation. Since the bar 9 is twisted, the driven shaft 3 rotates in response to rotation of the driving shaft 2 such that a phase difference is produced between them.

In the first-mentioned torque converter shown in FIGS. 2 and 3, the fixed pin 18 is invariably biased away from the fixed pins 16 and 17 by the action of the spring 22 in the form of scissors. Because of the phase difference between the shafts 2 and 3, one leg of the V-shaped spring 21 is kept under the same tension, while the tension applied to the other is about to be reduced, or vice versa, depending on the direction of rotation of the driving shaft 2. In the condition shown in FIG. 2, if the fixed pin 16 moves to the left relative to the fixed pin 17, then the tension applied to the leg 21a fixed to the pin 16 is about to be reduced, while the leg 21b fixed to the pin 17 is kept under the same tension. However, since the pin 18, or the protrusion 15, is biased in the same direction as the direction of rotation of the driving shaft 2 by the spring 22, the leg 21a is also pulled. Then the pin 18, hence the core 12 of the sleeve cylinder 10, is displaced downwardly as viewed in FIG. 2. The direction and the amount of the displacement of the core 12 are detected by the differential transformer 13.

In the last-mentioned torque sensor shown in FIGS. 4–6, the sleeve cylinder 10 is always urged to move relative to the shafts 2 and 3 by the spring force of the tension spring 32 such that the holes 26, 27 are moved away from the holes 24, 25. Thus, the straight springs 30 and 31 are in tension. Therefore, the bent portions of the straight springs 30 and 31 are maintained in contact with the inner surfaces of the holes 24, 26, 25, 27 which are opposite to the bent portions irrespective of the direction of rotation of the shafts even if a phase difference is produced between the shafts 2 and 3 because of torque transmission, although gaps are normally formed between the bent portions of the springs 30, 31 and the corresponding holes 24, 26, 25, 27.

In the latter example, when torque is being transmitted from the driving shaft 2 to the driven shaft 3, if a phase difference is produced between them, then one straight spring is retained in the same tension, while the tension applied to the other is about to be reduced. This relation can be reversed according to the direction of rotation of the driving shaft 2. As an example, in the condition shown in FIG. 6, if the hole 24 moves to the left relative to the hole 25, the tension applied to the straight spring 30 mounted in the holes 24, 26 is about to be decreased while the straight spring 31 mounted in the holes 25, 27 is maintained under the same tension. At this time, the pin 29, or the protrusion 15, is biased in the same direction as the direction of rotation of the driving shaft 2 by the tension sprint 32 and so the holes 26, 27, or the core 12 of the sleeve cylinder 10 is displaced downwardly as viewed in FIG. 6 to maintain the straight spring 30 in tension. The direction and the amount of the displacement are detected by the differential transformer 13.

In either example described above, the magnitude of the torque transmitted from the driving shaft 2 to the driven shaft 3 is proportional to the amount of rotation which is produced between the driving shaft 2 and the driven shaft 3 by torsion of the torsion bar 9. Therefore, the magnitude is detected by the differential transformer 13, utilizing the above-described operation.

It will be easily understood that where torque is transmitted in the direction opposite to the foregoing, the torque transmitted is detected in like manner.

The aforementioned torque sensors can be suitably used between the input shaft of the steering system of an automobile and the output connected with a pinion, the input shaft being connected with the steering wheel.

Obviously, numerous modifications and variations of the present invention are possible in light of the above teachings. It is therefore to be understood that within the scope of the appended claims, the invention may be practiced otherwise than as specifically described herein.

We claim:
1. A torque sensor comprising:
 a driving shaft held such that it can make only rotary motion about an axis;
 a driven shaft held such that it can make only rotary motion about the axis;
 a sleeve cylinder fitted over one of the shafts around its axial end opposite to the other shaft such that the cylinder can be rotated and axially displaced;
 means for detecting the axial displacement of the cylinder;
 a plurality of connector members inclined in opposite directions about a direction perpendicular to the axis within a plane parallel to the axis, one end of each of the connector members being mounted to the sleeve cylinder, the other ends of the connector members being mounted to the opposite axial ends of the shafts, respectively; and
 biasing means for rotating the sleeve cylinder relative to one of the shafts to apply a tensile force to the connector members.

2. The torque sensor of claim 1, further including a torsion bar mounted coaxially with the driving and driven shafts, the opposite ends of the torsion bar being connected to the shafts, respectively.

3. The torque sensor of claim 1, further including:
 a plurality of pins rigidly fixed to the driving shaft, the driven shaft, and the sleeve cylinder perpendicularly to the plane in which the connector members are disposed, the ends of the connector members being connected to the pins; and
 a lock member which prevents the connector members from moving relative to the pins to prevent at least one of the pins fixed to the sleeve cylinder from moving toward two of the pins fixed to the shafts.

4. The torque sensor of claim 3, wherein when no torque acts, said at least one pin fixed to the sleeve cylinder is equidistant from said two pins fixed to the shafts in the axial direction of the sleeve cylinder and in a direction perpendicular to it.

5. The torque sensor of claim 1, wherein
 (A) each of the connector members has a central portion and bent portions at both ends thereof, the central portions of the connector members being equal in length, the bent portions of the connector members being equal in length;
 (B) wherein the driving shaft and the driven shaft have respective holes which, when no torque acts, are aligned along the axis of the shafts and in which the bent portions at said other ends of the connector members are received; and
 (C) the sleeve cylinder has two holes which receive the bent portions at said one end of each of the connector members and which are aligned along the axis of the cylinder.

6. The torque sensor of claim 1, wherein the connector members regularly spaced from each other circumferentially of the driving and driven shafts at opposite ends of the shafts, each set consisting of said plurality of connector members.

7. The torque sensor of claim 1, wherein each of the connector members if of a linear form.

8. The torque sensor of claim 1, wherein said biasing means comprises a spring mounted between one of the shafts and the sleeve cylinder.

* * * * *